Patented July 17, 1928.

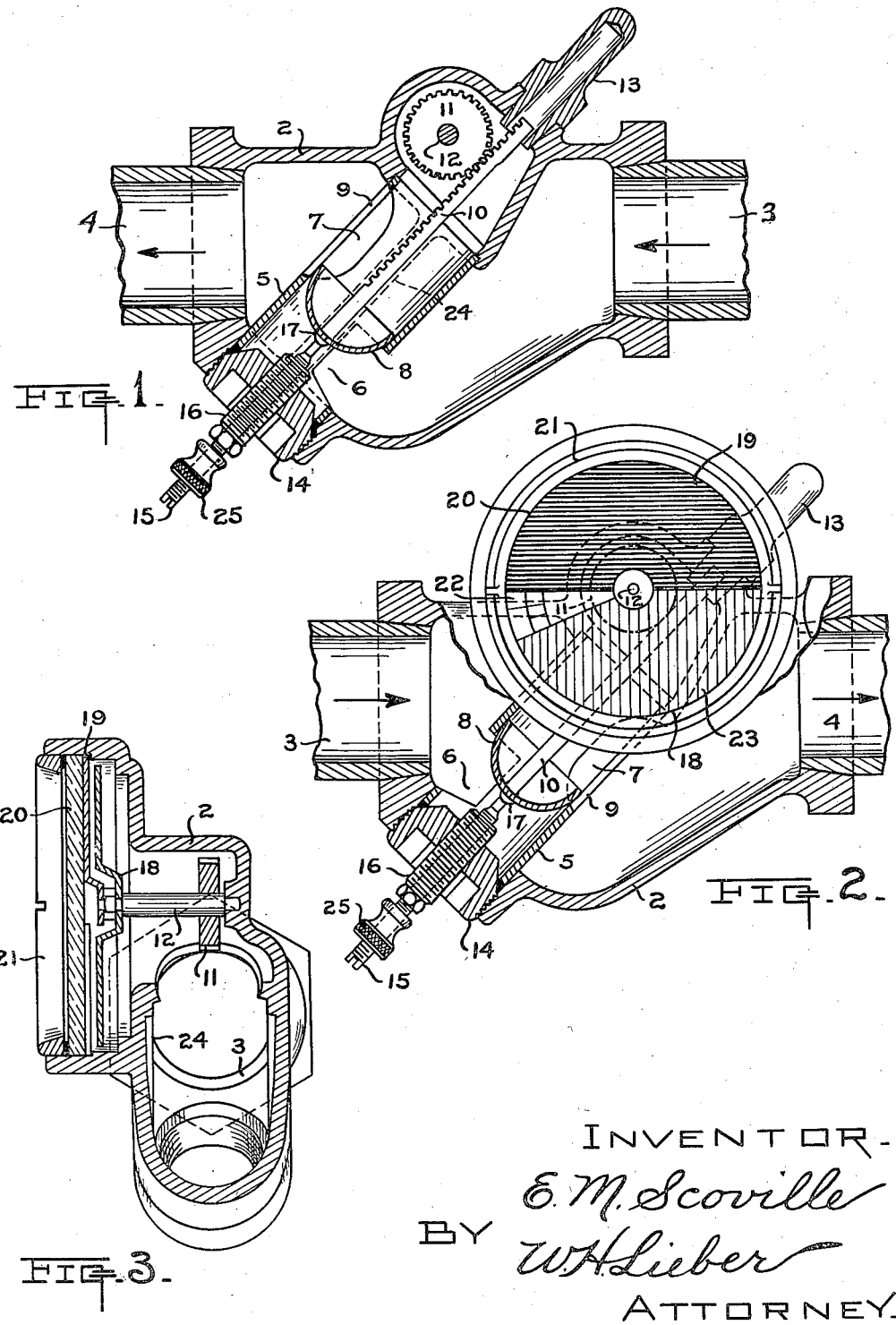

1,677,411

UNITED STATES PATENT OFFICE.

EUGENE M. SCOVILLE, OF MILWAUKEE, WISCONSIN, ASSIGNOR OF ONE-HALF TO FLOYD L. SWANBERG, OF PITTSBURGH, PENNSYLVANIA.

FLOW METER.

Application filed September 13, 1924. Serial No. 737,635.

This invention relates in general to improvements in the art of facilitating determination of characteristics of confined fluids, and relates more specifically to improvements in the construction and operation of devices for automatically indicating the quantity or the rate of flow of liquids through conduits such as pipe lines.

An object of the invention is to provide a flow meter or indicator which is simple in construction and efficient in operation.

Some of the more specific objects and advantages attainable with the present improvement, are as follows:—

To provide a reliable flow indicator which is positive and automatic in action and which may be disposed in various desired positions without affecting its efficiency.

To provide flow indicating structure which does not undesirably obstruct the flow of fluid and which is readily adjustable to permit reversal in direction of the flow.

To provide a meter all parts of which are readily removable and accessible for inspection and cleaning.

To provide a flow meter which is simple, compact and substantial in construction and which may be manufactured in quantity at relatively low cost.

To provide a flow measuring device the operation of which is plainly visible from a distance, and which automatically functions to sound an alarm when the quantity of flow reaches a predetermined low value.

To provide a flow indicator for fluid conducting pipe lines, wherein escape of fluid is effectively prevented by confining the movable parts in a leak-proof housing.

To provide a sight flow indicator which is especially applicable to lubricant conducting systems.

To provide improvements in the construction and operation of flow indicators or meters, whereby the cost of manufacture of such apparatus is reduced to a minimum and the efficiency is enhanced to a maximum.

These and other objects and advantages of the present improvement will be apparent in the course of the accompanying description.

A clear conception of several embodiments of the invention and of the operation of devices constructed in accordance therewith, may be had by referring to the drawing accompanying and forming a part of this specification in which like reference characters designate the same or similar parts in the various views.

Fig. 1 is a central longitudinal section through an improved flow meter the elements of which have been adjusted to accommodate a flow from right to left.

Fig. 2 is a part sectional side elevation of an improved flow meter the elements of which have been adjusted to accommodate a flow from left to right.

Fig. 3 is a central transverse section through the main casing and the visible indicator of an improved flow meter.

The specific form of the invention illustrated in the drawing comprises in general a main casing 2 forming a fluid conducting conduit; a ported tubular auxiliary casing 5 adjustably secured within a diagonal bore of the main casing 2; a piston or plunger 8 movable longitudinally within the tubular casing 5; and visible flow indicating mechanism associated with the plunger 8 and housed within an integral portion of the casing 2.

The main casing 2 is preferably formed somewhat similar to an ordinary pipe fitting, having screw threaded opposite ends adapted for attachment thereto of supply and discharge pipes 3, 4. The tubular auxiliary casing 5 may be formed of standard circular pipe and snugly fits the diagonal bore of the main casing 2 thus forming a conduit extending at an oblique angle relative to the general direction of flow of fluid through the casing 2. A socketed plug 14 having screw threaded coaction with the casing 2, serves to clamp the tubular casing 5 in position, the casing 5 being readily reversible in position as shown in Figs. 1 and 2. The auxiliary casing 5 has a lower inlet port 6 and an upper oppositely disposed discharge port 7, the latter being spanned longitudinally by a plunger guiding strip 9 as shown. The opposite sides of the tubular casing 5 snugly fit side ribs 24 formed on the interior of the casing 2, thus positively preventing the passage of fluid through the casing 2 without passing through the interior of the casing 5.

The piston or plunger 8 may be of hemispherical shape and has a sliding fit within the tubular casing 5. The rack rod 10 is secured to and extends upwardly from the plunger 8, the upper extremity of the rod 10 being slidable within a recess in the guiding cap 13 which is removably secured to the casing 2. The lower extremity of the rod 10 provides an electrical contact 17 which is adapted to coact with the upper extremity of an adjustable contact pin or rod 15 when the plunger 8 drops into its lowermost or inoperative position. The rod 15 is adjustably supported by means of an insulating bushing 16 secured to the plug 14, and a thumb nut 25 serves to attach the electric wiring for an alarm, to the rod 15.

The teeth of the rack rod 10 mesh with the teeth of a spur pinion 11 secured to a shaft 12 which is mounted in bearings in the casing 2 and in the center of the fixed indicator disk 19 respectively. The revolving indicator disk 18 is carried by the shaft 12 within the casing 2 and closely adjacent to the rear of the fixed disk 19. The outer surface of the fixed disk 19 is preferably enameled black and the lower portion of this disk is cut out semi-circular as shown. The outer lower half 23 of the revolving disk 18 may be enameled red, blue or green and the outer upper half is preferably enameled white, the white enameled surface 22 being graduated and entirely hidden behind the stationary disk 19 when the plunger 8 is in its lowermost or inoperative position. The visible surfaces of the disks 18, 19 are covered by a transparent glass facing 20, the disk 19 and the glass facing 20 being clamped against the casing 2 by means of a removable clamping ring 21. The joints between the removable plug 14, cap 13, ring 21 and the casing 2 are preferably sealed by means of packing gaskets in order to positively prevent escape of fluid from within the main casing.

When utilizing the flow meter to measure the rate of flow of fluid flowing from right to left, the auxiliary tubular casing 5 is clamped by means of the plug 14, in the position shown in Fig. 1. The fluid then enters the casing 2 through the supply or inlet pipe 3 and flows upwardly through the lower port 6 of the tubular casing 5 against the lower face of the plunger 8. The pressure produced by the advancing fluid, forces the plunger 8 and the rack rod 10 upwardly within the auxiliary casing 5 thus rotating the pinion 11, shaft 12 and the revolving disk 18 in a counter-clockwise direction and exposing more or less of the graduated white surface 22, dependent upon the rate or quantity of flow. As the plunger 8 is raised, the electrical contacts 15, 17 are separated and the fluid is permitted to flow through the upper port 7 by virtue of the fact that this port is uncovered by the rising plunger 8. If the flow is slight, the plunger 8 will rise only slightly, whereas a greater flow of fluid will cause greater rise of the plunger 8 and hence greater exposure of the white disk surface 22. The fluid delivered from the port 7 is discharged from the main casing 2 through the discharge or outlet pipe 4.

When utilizing the flow meter to measure the rate of flow of fluid from left to right, the auxiliary tubular casing 5 is clamped in the position shown in Fig. 2, by means of a screw plug 14. The fluid then enters the casing 2 through the supply or inlet pipe 3 and flows upwardly through the lower port 6 of the auxiliary casing 5 against the lower surface of the plunger 8. The pressure thus produced causes the plunger 8 and the rack rod 10 to move upwardly and to rotate the pinion 11, shaft 12 and the revolving disk 18 in a counter-clockwise direction thus exposing an amount of the graduated white surface 22 which is proportional to the rate or quantity of flow. When the plunger 8 rises, the electrical contacts 15, 17 are separated and the fluid is permitted to escape from the casing 5 through the upper port 7. The fluid delivered from the port 7 is discharged from the main casing 2 through the discharge or outlet pipe 4.

It will thus be noted that the meter will effectively indicate the rate of flow regardless of the direction of flow. If the device is used to measure the flow of fluids having insulating qualities, such as oil or gases, the layer of fluid located between the contacts 15, 17 when separated, will effectively insulate these contacts from each other thus maintaining the alarm circuit broken as long as the flow of fluid continues. If the flow is interrupted and the plunger 8 is permitted to drop, the contacts 15, 17 are brought into direct engagement thus sounding the alarm. The plunger 8 will drop to its lowermost position by gravity when the flow ceases, and the efficiency of the device is not affected by other proper dispositions thereof. The guiding strip 9 which spans the opening or port 7 effectively prevents the plunger 8 from jamming into this opening when the casing 5 is positioned as shown in Fig. 2.

The main casing 2 is readily machinable with the aid of drills, taps and standard tools, and is preferably formed of a single casting. The other elements of the structure may be readily manufactured at minimum cost and the ring 21, cap 13 and plug 14 permit access to and removal of every element of the device for inspection and cleaning. The movable parts of the mechanism are all confined entirely within a leak-proof housing thus preventing undesirable escape of fluid and making the apparatus especially adaptable to lubricating systems. The use of colored indicating disks 18, 19 makes the operation apparent to an observer located at a considerable distance from the device. The flow meter is extremely simple and compact and presents a neat appearance thus providing a desirable accessory for modern power house installations.

It should be understood that it is not desired to limit the invention to the exact details of construction and operation herein shown and described, for various modifications within the scope of the claims may occur to persons skilled in the art.

It is claimed and desired to secure by Letters Patent:—

1. In combination, a main casing forming a through conduit and having a bore extending diagonally across the axis of said conduit, a reversible tubular member fitting said bore so as to prevent flow through said casing around said member and having staggered inlet and discharge ports communicating with said conduit at opposite sides of said member, a plunger slidable within said tubular member above said inlet port and formed to intercept communication between said ports when said plunger is in its lowermost position, and an indicator operable by said plunger.

2. In combination, a main casing forming a through conduit and having a bore extending diagonally across the axis of said conduit, a tubular member fitting said bore so as to prevent flow through said casing around said member and having staggered inlet and discharge ports communicating with said conduit at opposite sides of said member, a plunger slidable within said tubular member above said inlet port and formed to intercept communication between said ports when said plunger is in its lowermost position, an indicator operable by said plunger, and an adjustable electric contact providing a motion limiting stop for said plunger.

3. In combination, a main casing forming a through conduit and having a bore extending diagonally across the axis of said conduit, a reversible tubular member fitting said bore so as to prevent flow through said casing around said member and having staggered inlet and discharge ports communicating with said conduit at opposite sides of said member, a plunger slidable within said tubular member above said inlet port and formed to intercept communication between said ports when said plunger is in its lowermost position, an indicator associated with the top of said plunger, and an adjustable electric contact cooperating with the bottom of said plunger to limit the downward travel thereof.

In testimony whereof, the signature of the inventor is affixed hereto.

EUGENE M. SCOVILLE.